Figure 1:
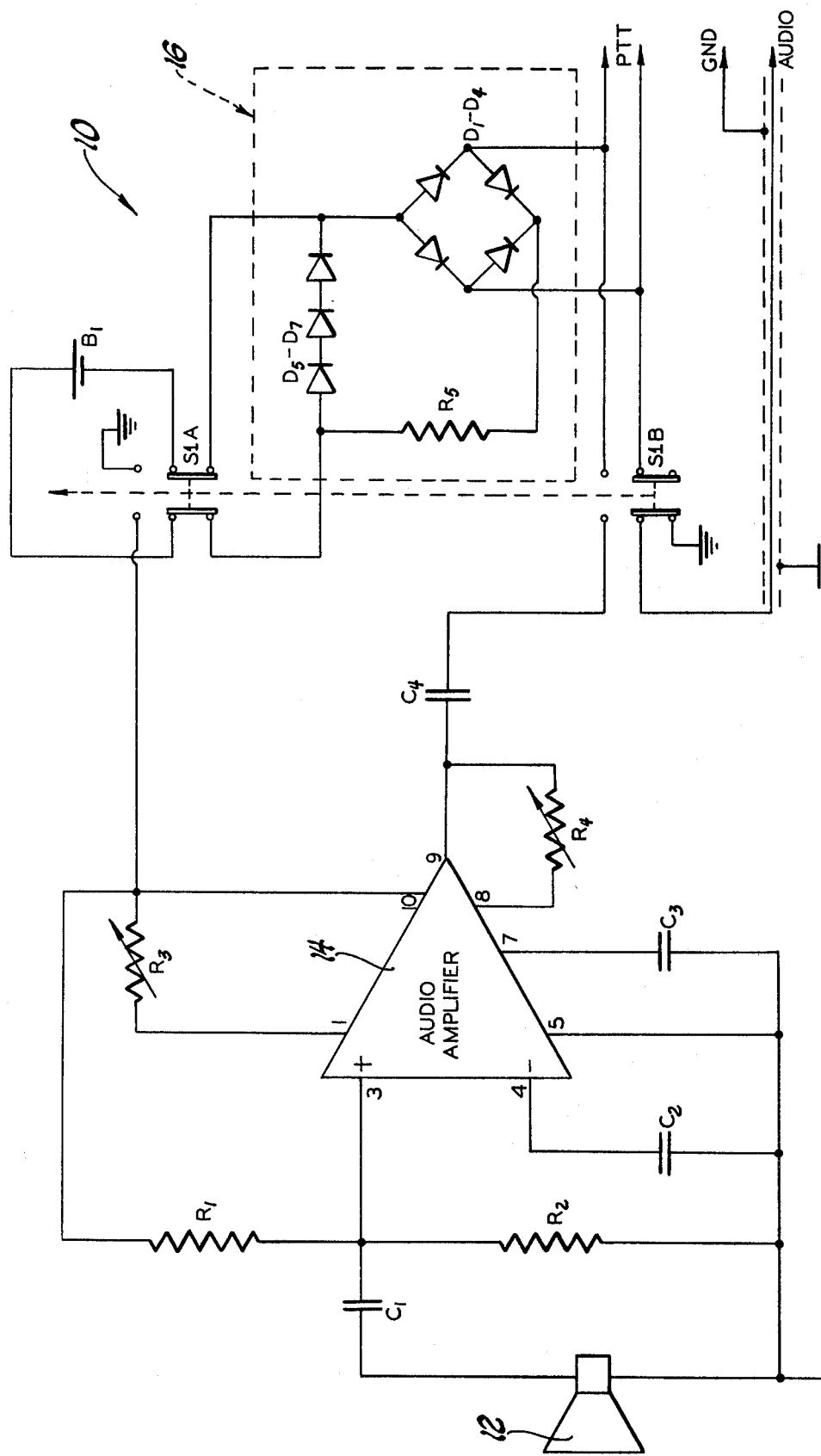

United States Patent
Hochstein

[11] 4,096,439
[45] Jun. 20, 1978

[54] AMPLIFIED MICROPHONE ASSEMBLY

[76] Inventor: Peter A. Hochstein, 14020 15 Mile Rd., Sterling Heights, Mich. 48077

[21] Appl. No.: 754,249

[22] Filed: Dec. 27, 1976

[51] Int. Cl.$^2$ .............................................. H04B 1/40
[52] U.S. Cl. ........................................ 325/21; 320/1
[58] Field of Search ........................... 325/15, 21, 22; 179/1 A, 1 H; 320/1

[56] References Cited

U.S. PATENT DOCUMENTS

| | | | |
|---|---|---|---|
| 3,112,445 | 11/1963 | Holden | 325/21 |
| 3,305,638 | 2/1967 | Teachout | 179/1 A |
| 3,394,311 | 7/1968 | Pursley | 325/21 |
| 3,465,252 | 9/1969 | McLean | 325/21 |
| 3,535,689 | 10/1970 | Oden | 325/15 |
| 3,980,996 | 9/1976 | Greenspan | 320/1 |
| 4,032,844 | 6/1977 | Imazeki | 325/15 |

*Primary Examiner*—Benedict V. Safourek
*Assistant Examiner*—Michael A. Masinick
*Attorney, Agent, or Firm*—McGlynn & Milton

[57] ABSTRACT

An amplified microphone assembly for increasing the intelligibility of transmitted speech and including a microphone element, an audio amplifier, an auxiliary power supply and a push-to-talk switch. The microphone element converts an audio signal to an electrical signal while the audio amplifier amplifies the electrical signal. The auxiliary power supply supplies power to the audio amplifier when the push-to-talk switch is actuated, at which time an audio signal from the amplifier is sent to a radio transceiver. The power supply is chargeable and includes a charging circuit for charging the power supply. A connecting cable connects the microphone assembly to a transceiver and includes an audio lead and two push-to-talk leads which place the transceiver in the transmit mode when the push-to-talk switch is actuated. The charging circuit is connected across the push-to-talk leads and utilizes the voltage drop therebetween, as generated in the transceiver when the leads are not connected in the receive mode to, in turn, recharge the power supply. In the first embodiment of the invention the power supply includes a rechargeable battery and in the second embodiment of the invention the power supply includes a low-leakage high-capacity capacitor.

12 Claims, 2 Drawing Figures

AMPLIFIED MICROPHONE ASSEMBLY

BACKGROUND OF INVENTION

This invention relates to microphone assemblies and, in particular, to microphone assemblies having a built-in audio amplifier.

The very large number of radio transmitters now operating in any given band creates a constant background noise level making communication difficult.

Many techniques have been developed for enhancing the intelligibility of speech transmitted, for example, by a radio transceiver. The simplest form of these techniques is clipping, wherein the average modulation is increased by removing the amplitude peaks found in speech. Some difficulties associated with this technique include increased distortion at high limiting levels and the generation of high order products which further reduce intelligibility unless careful filtering is used. More advanced techniques include fast attack, slow release, automatic gain control amplifiers commonly called audio commpressors. Some compressors have dynamic ranges in excess of 60dB with very low attendant distortion. However, it has been shown that unless some form of frequency shaping precedes the clipping or automatic gain control stage, the average transmitted power may actually increase with little improvement in intelligibility. This phenomenon is a result of the energy frequency distribution of human speech.

Amplified communication microphones are widely utilized to increase the average "talk power" but they create other problems. These microphones are generally equipped with simple nonautomatic gain control transistor amplifiers with accessible gain controls and, in order to attain a high average voice modulation level, the transmitter is over modulated on the peaks of the voice signal. This over-modulation causes distortion, adjacent channel splatter and, in effect, reduces intelligibility of the transmitted signal.

Furthermore, the circuits are disposed within the microphone case and are powered by replaceable batteries. To obtain reasonable battery life in these circuits in microphones, mercury batteries may be used as the primary power source. These batteries are relatively expensive and replacements are not generally available. When used, these batteries have a useful life which is a function of their Amp-hour capacity which, in turn, is a function of their physical size. As a result, some commercial amplified microphones are uncomfortably large and awkward to handle since the batteries and the audio compressor are mounted within the microphone case. The service life of these batteries is, of course, a function of their usage schedule and, since usage schedules are nearly impossible to predict, these batteries must be frequently replaced to assure that power is always available.

The present invention does away with the need for having bulky power supplies within the microphone case and also the necessity of frequently replacing the power supply such as a battery.

A microphone assembly constructed in accordance with the instant invention includes a transducer means for converting an audio signal to an electrical signal, an amplifying means for amplifying the electrical signal, a rechargeable power supply means for supplying power to the amplifying means, connection means for electrical connection to a radio transceiver to transmit electrical signals between the microphone assembly and the transceiver, and switching means for placing the power supply means in electrical contact with the amplifying means and the amplifying means in electrical contact with the connection means during a first or transmit mode and for placing the power supply means in electrical contact with the charging means and the charging means in electrical contact with the connection means during a second or receive mode.

Figure 2:
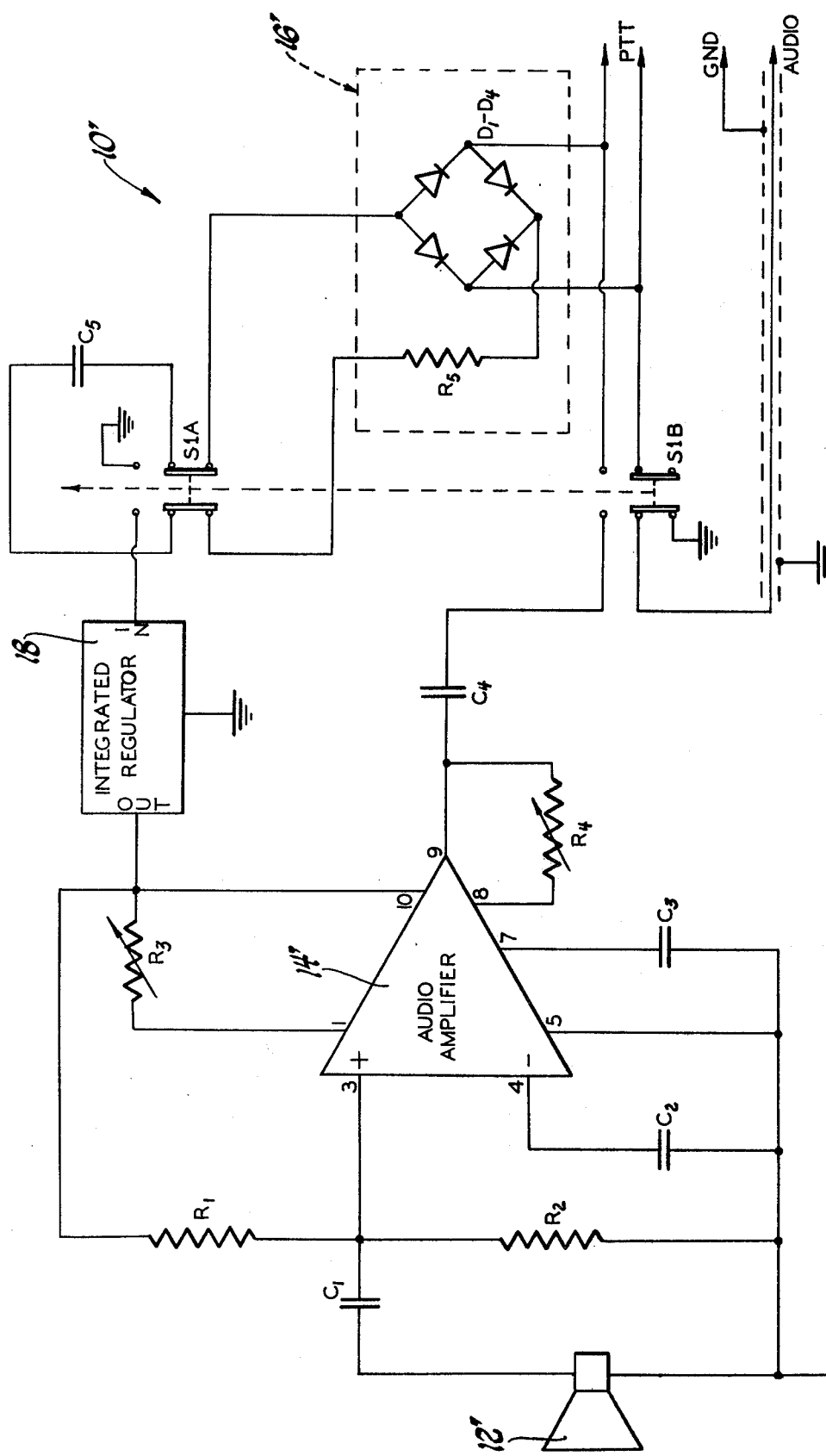

Other advantages of the present invention will be readily appreciated as the same becomes better understood by reference to the following detailed description when considered in connection with the accompanying drawings wherein:

FIG. 1 is an electronic circuit diagram showing a first embodiment of the invention; and FIG. 2 is a circuit diagram showing a second embodiment of the invention.

A microphone assembly constructed in accordance with the instant invention is generally shown at 10 in FIG. 1. The microphone assembly 10 is adapted for use in a C.B. (Citizens Band) radio transceiver and includes a transducer means or microphone element 12 for converting an audio signal to an electrical signal as is well known in the art. The audio response characteristic of the microphone element 12 is shaped to optimize the frequency response of the microphone element 12 to those frequencies of human speech which contribute most to intelligibility. That is, the low frequency portions of the vocal frequency spectrum are not amplified or transmitted. For example, the response of microphone element 12 may be shaped so that a 12dB per octave below 1.4 kilohertz and a sharp rolloff above 2 kilohertz is realized.

The microphone assembly 10 also includes any amplifying means such as a Raytheon RM 8341 low power audio amplifier 14 with automatic gain control. The audio amplifier 14 is utilized conventionally for amplifying the electrical signal produced by the microphone element 12. The remaining circuit elements which are used conventionally include: a 0.03 micro-Farad capacitor, $C_1$; a 200 kilo-Ohm resistor, $R_1$; a 100 kilo-Ohm resistor, $R_2$; a 3.5 micro-Farad capacitor, $C_2$; a 20 kilo-Ohm variable resistor, $R_3$; a 1 micro-Farad capacitor, $C_3$; a variable resistor, $R_4$, which varies between 20 and 300 kilo-Ohms to vary the gain of the audio amplifier 14 and a 2 micro-Farad capacitor, $C_4$.

The microphone 10 also includes a rechargeable power supply means such as a single rechargeable Eveready CH 150T nickel-cadmium battery, $B_1$ which supplies power to the audio amplifier 14 when a switching means or conventional push-to-talk (PTT) switch having contacts $S_{1A}$ and $S_{1B}$ is actuated. The contacts $S_{1A}$ and $S_{1B}$ place the battery $B_1$ into and out of electrical contact with the audio amplifier when the PTT contacts are manually actuated, thereby acting as a switch. In other words, the battery is placed in electrical contact with the audio amplifier 14 when the PTT contacts are depressed and out of electrical contact when the PTT contacts are released.

The power supply means also includes a charging means generally indicated at 16 for charging the battery $B_1$. The charging means 16 includes a full-wave bridge rectifier made up of low power diodes $D_1$ through $D_4$ to render the charging means 16 polarity immune. A resistor $R_5$ causes a low fixed current to flow through the forward biased diodes $D_5$–$D_7$. The forward voltage drop across diodes $D_5$–$D_7$ is used to charge $B_1$.

The minimal power required to keep $B_1$ battery charged is derived from the open PTT contacts that are typically mounted in the microphone case. Most frequently voltages on the order of 6 to 12 volts appear across these PTT leads connected to $S_{1B}$ contacts and a transceiver. In other words, the power is derived from the transceiver.

In operation, the battery $B_1$ charges when the PTT switch, which includes contacts $S_{1A}$ and $S_{1B}$, is in the signal receive position or mode as shown in FIG. 1. When the switch is actuated or depressed, the PTT contacts move upwardly from the position of FIG. 1 and through contacts $S_{1B}$, place a radio transmitter modulation input (not shown) into electrical contact with the output of audio amplifier 14 through an audio lead while at the same time the contacts $S_{1A}$ connect the battery $B_1$ to the audio amplifier 14.

FIG. 2 shows a second embodiment of the present invention in which the circuit is the same or similar in function to the circuit shown in FIG. 1 but is shown in prime numerals, which numerals correspond to the numerals of FIG. 1.

A low leakage high capacity capacitor $C_5$, i.e., tantalum, is substituted for the battery $B_1$ of FIG. 1. The capacitor $C_5$ is a power supply means to store sufficient energy during receive periods or modes of the transceiver to power an audio amplifier 14' during the transmit mode for periods of time of up to 5 minutes. An regulator 18 is provided between the capacitor $c_5$ and the audio amplifier 14' to regulate the voltage current delivered by the capacitor $C_5$ to the audio amplifier 14'. The circuit diagram of FIG. 2 is identical with the circuit diagram of FIG. 1 except an a regulator 18 is included to limit the voltage output from the capacitor $C_5$ so that the normally exponentially decreasing voltage output of the capacitor is controlled at a given level for a certain period of time. In other words, the voltage output of the capacitor is prevented from peaking to high values at the amplifier and is controlled to increase the time the required voltage is available from the capacitor $C_5$.

Further, diodes $D_5$ through $D_7$ may be omitted when the capacitor $C_5$ is used. Otherwise, the circuit of FIG. 2 is identical to that of FIG. 1 and operates in the same manner.

The leads labeled PTT leading from the contacts $S_{1B}$ are connected to a transceiver and, more specifically, to a control device, such as a relay, or the like, which controls transceiver circuitry to place the transceiver in the transmit mode when the two PTT leads are connected when the $S_{1B}$ switch is moved upwardly from the position shown, i.e., to the transmit position. When the $S_{1B}$ switch is moved upwardly the lead is labeled audio, which extends to the transmitter for conveying the electrical audio signal, is placed in electrical contact with the output lead of the amplifier. The dashed lines on either side of the audio lead indicates that the lead is shielded in the well known fashion. Of course, the contacts $S_{1A}$ move in unison with the contacts $S_{1B}$ and together comprise the "push-to-talk" switch.

The charging means 16 is connected across or between the push-to-talk leads labeled PTT. The leads labeled PTT and the audio lead are all enclosed in an electrical connection cable leading from the microphone unit to the transceiver in the well known fashion and together define connection means for electrical connection to the radio transceiver to transmit electrical signals from the microphone assembly 10 or 10' to the transceiver. Said another way, the audio and PTT leads connect the microphone assembly to a transceiver to transmit electrical power signals between the microphone assembly and the transceiver.

Broadly, in both embodiments there is included a transducer means 12 or 12' for converting an audio signal to an electric audio signal which is, in turn, conveyed to an amplifying means 14 or 14' for amplifying the electrical audio signal from the transducer means 12 or 12'. Also included is a rechargeable power supply means, comprising a battery $B_1$ or a capacitor $C_5$, for supplying power to the amplifying means 14 or 14'. Also included is a charging means 16 or 16' for charging the power supply means. As alluded to above, the PTT leads and the audio lead define connection means for electrical connection to a radio transceiver to place the transceiver in the transmit mode to convey the audio electrical power signal by transmitting electrical power signals between the microphone assembly 10 or 10' and the transceiver. In addition, there is included switching means, defined by a push-to-talk switch having contacts $S_{1A}$ and $S_{1B}$, for supplying electrical power to the charging means 16 or 16' from the PTT leads of the connection means and to the power supply means ($B_1$ or $C_5$) from the charging means 16 or 16' during a first or receive mode and for supplying electrical power to the amplifying means 14 or 14' from the power supply means and to the audio lead of the connection means from the amplifying means 14 or 14' during a second or transmit mode. Said another way, the push-to-talk switch is biased to the position illustrated which is the receive mode of the transmitter. In this receive mode, the PTT leads or contacts $S_{1B}$ are open and there exists a voltage between these open or disconnected PTT leads, as they are connected to the transceiver, of about 6 to 12 volts, which, as explained above, is utilized by the charging means 16 or 16' to charge the power supply means comprising a battery or capacitor as the $S_{1A}$ contacts connect the charging means to the power supply means. In the receive mode, the audio lead is disconnected from the amplifier 14 or 14' and the amplifier is disconnected from the power supply means. When it is desired to transmit, the push-to-talk switch is manually depressed and the contacts $S_{1A}$ and $S_{1B}$ are moved in unison from the position illustrated to the transmit position to establish the transmit mode. In the transmit mode, the power supply means is disconnected from the charging means 16 or 16' and is connected to the amplifier 14 or 14' through the contact $S_{1A}$. At the same time the two PTT contacts are closed to connect the PTT leads which, in turn, place the transceiver in the transmit mode. When the contacts $S_{1B}$ are closed to connect the PTT leads, current flows from the transceiver through one of the PTT leads, through the $S_{1B}$ contacts and back to the transceiver through the other PTT lead to actuate a control circuit to place the transceiver in the transmit mode. In this condition, there is no voltage drop between the PTT leads to which the charging means may respond. Also, the audio lead is placed in electrical contact with the amplifier 14 or 14' during the transmit position or mode to transmit the electrical audio signal to the transceiver. To return to the receive mode the push-to-talk switch is merely released.

As will be appreciated, all of the components are encased in a microphone housing with the connection means or cable extending therefrom for connection to a transceiver. Also, the rechargeable power supply is recharged by power from the transceiver but only during the receive mode when the amplifier does not require the power supply. Said another way, the rechargeable power supply is recharged with electrical power which is available when the transceiver is in the receiver mode and that power is utilized to power the amplifier in the transmit mode when that power is not available across the push-to-talk switch leads.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A microphone assembly comprising: transducer means for converting an audio signal to an electrical signal, amplifying means for amplifying said electrical signal from said transducer means, rechargeable power supply means for supplying power to said amplifying means, charging means for charging said power supply means, connection means for electrical connection to a radio transceiver to transmit electrical power signals between said microphone assembly and the transceiver, and switching means for supplying electrical power to said charging means from said connection means and to said power supply means from said charging means during a first mode and for supplying electrical power to said amplifying means from said power supply means and to said connection means from said amplifying means during a second mode.

2. An assembly as set forth in claim 1 wherein said switching means is alternately in either said first or second modes.

3. An assembly as set forth in claim 2 wherein said switching means includes a manually actuated switch having a receive position for establishing said first mode and a transmit position for establishing said second mode.

4. An assembly as set forth in claim 3 wherein said connection means includes an audio lead extending from said switch for conveying electrical power in the form of an electrical audio signal from said amplifying means when connected thereto through said switch in said transmit position.

5. An assembly as set forth in claim 4 wherein said connection means includes a pair of push-to-talk leads extending from said switch for conveying electrical power to and from the transceiver when connected together through said switch in said transmit position for placing the transceiver in the transmit mode, said charging means being connected between said push-to-talk leads.

6. An assembly as set forth in claim 5 wherein said charging means includes a voltage rectifier.

7. An assembly as set forth in claim 6 wherein said power supply means comprises a rechargeable battery.

8. An assembly as set forth in claim 6 wherein said power supply means comprises a capacitor.

9. An assembly as set forth in claim 8 including a regulator for regulating the voltage output of said capacitor.

10. An assembly as set forth in claim 1 wherein said amplifying means includes an audio compressor.

11. A microphone assembly comprising; transducer means for converting an audio signal to an electrical signal during a transmit mode, amplifying means for amplifying said electrical signal from said transducer means during said transmit mode, rechargeable power supply means for supplying power to said amplifying means during said transmit mode, charging means for charging said power supply means during a receive mode, and switching means for placing said assembly in one of said transmit mode and said receive mode.

12. An assembly as set forth in claim 11 wherein said power supply means comprises a capacitor and including a regulator for regulating the output of said capacitor.

* * * * *